Patented Oct. 10, 1939

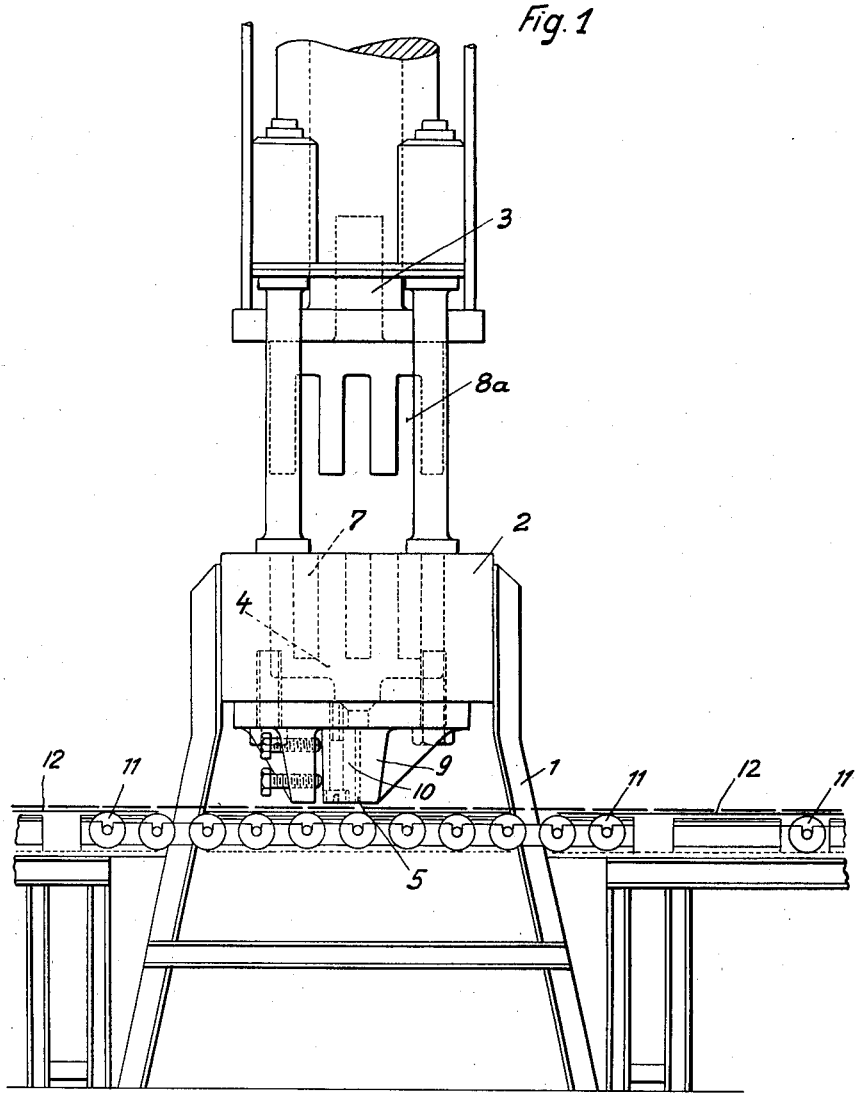

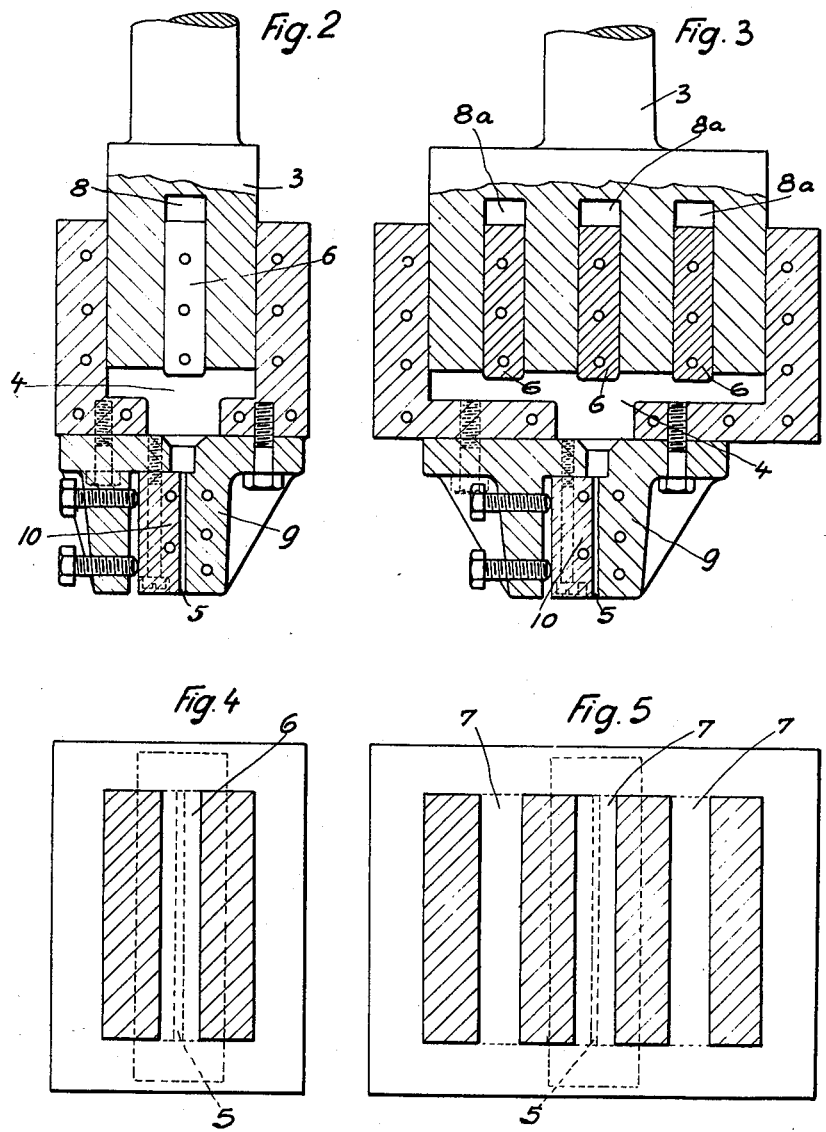

2,175,961

UNITED STATES PATENT OFFICE 2,175,961

APPARATUS FOR THE PRODUCTION OF FOILS AND PLATES, PARTICULARLY FROM HIGHLY ELASTIC POLYMERIZATION PRODUCTS

Adolf Kämpfer, Charlottenburg, Berlin, Germany

Application April 23, 1936, Serial No. 76,046
In Germany January 31, 1936

12 Claims. (Cl. 49—81.5)

The invention relates to a press for the production of foils and plates and particularly of those formed from masses of highly elastic polymerization products, by extruding the mass from a press chamber capable of being heated, and to a process for coating glass plates and other surfaces with these foils or plates for the purpose of producing a non-splintering glass unit or the like.

The presses proposed previously for this purpose are not suitable for highly elastic polymerization products, because it is not possible by means of these presses to obtain foils and plates of uniform thickness by reason of the high expansion elasticity of the mass to be extruded, and of its inclination to expand after each compression application.

These highly elastic masses, for which the press according to the invention is more particularly intended, are high molecular polymerization products of unsaturated organic initial compounds which are not plastic at ordinary temperatures and even when subjected to the maximum stress of tension, expansion and pressure strain again assume their original shape. They are preferably obtained by a polymerization process forming the subject of another application Serial No. 76,044, filed April 23, 1936, on Process for the manufacture of laminated glasses or the like, the polymerization being carried to the final stage or approximately to the final stage in the presence of certain organic admixtures, without forming solid products as was the case when such organic compounds were polymerized to this stage by the methods formerly proposed or used, and in contrast thereto they are not capable of being splintered or pulverized by reason of their high expansion elasticity. They may, however, be rendered flexible under a suitable pressure when they are heated with the necessary precautionary measures, i. e., by uniform heating to about 100° C. but not above 135° C. At this temperature they are so flexible that they can be extruded under pressure from comparatively narrow slots or holes. According to this invention advantage is taken of this property for the purpose of producing from the high molecular polymerized mass foils and plates of even thickness. For this purpose the press must respond to two requirements. It must render it possible to heat the mass which is a very poor conductor of heat, uniformly to 100° C., and is necessary to the maximum 135° C., and it must enable the mass to be subjected to intermittent pressure for the purpose of obtaining the necessary homogeneity, the pressure, however, being only allowed to be applied for from two to five minutes. The press must further be so formed that this mass can be extruded in plate form from a slot nozzle without change of shape after the extrusion.

According to this invention the pressure chamber is uniformly divided into suitable intermediate chambers by transverse walls and by the outer walls of the chamber located parallel to the transverse walls. The transverse and parallel walls are so constructed as to be capable of being heated, and this enables the mass which is thus divided, to be brought comparatively rapidly and uniformly to the necessary degree of temperature, in spite of its poor heat conductivity, and then to be exposed to the action of the pressure plunger. For example it has been found that the separate intermediate chambers between the transverse walls may have a depth of about 150 mm., though with a depth of only 100 mm. uniform heating is more quickly obtained and the danger of a maturing or discoloration by reason of non-uniform heating, is avoided. If the short side walls of the divided chamber were also heated, there would be an increased supply of heat in the vicinity of these short side walls and the required degree of temperature would be obtained here quicker than in their remaining parts of the chamber, which would lead to non-uniform heating or localized over heating, which might impair homogeneity and damage the entire contents of the chamber. This does not exclude the possibility of heating these short side walls to a lesser degree in order to exclude the action of a drop in temperature from the outside.

In order to meet the second condition, the slotted out-flow opening which extends in the known manner over the entire length of the chamber, is so constructed that its walls can be heated and that the outflow slot is of such a depth in the direction of movement of the mass that the mass has assumed a permanent shape before extrusion is complete.

Provision is thus made that the foil or plate extruded from this slot does not expand but has the thickness which is determined by the internal area of the slot. In order to enable the thickness of the extruding foils and plates to be adjusted, one wall of the foil and plate shaping slot is preferably made adjustable.

In order to utilize the fluidity and heat of the extruded mass for its direct application to glass plates for the production of compound glass or the like, the glass plates are moved transversely to the direction of movement of the mass passing out of the press at a distance from the outlet opening thereof which is about equal to the thickness of the extruded foils or plates so that heated foils or plates can be immediately combined with the preferably pre-heated glass-plates, so utilizing the inherent adhesiveness of the mass at this temperature. This also enables any air lying between the plate and foils to be driven out. When an adhesive, which should preferably have a high boiling point, has been previously applied to the glass plates, the incorporation of this adhesive in the foil or plate masses also takes place under the action of the heat carried by the latter.

An example of construction is shown in the drawings. Fig. 1 is a view in elevation, Figs. 2 and 3 are vertical sections through two pressure chambers differently arranged and Figs. 4 and 5 are horizontal sections through the pressure chambers according to Figs. 2 and 3.

With a pressure chamber 2 mounted on a frame 1 there co-operates a plunger 3 which forces the mass contained in the interior 4 of the chamber through the outlet slot 5 for forming foils or plates.

According to this invention the interior space 4 of the chamber is uniformly divided over approximately the entire height of the interior space of the chamber by transverse walls 6 (in the construction according to Figs. 2 and 4) or 7 (in the construction according to Figs. 3 and 5), the plunger is also correspondingly sub-divided by intermediate spaces 8 (Fig. 2), 8a (Fig. 3) for the purpose of receiving these transverse walls. The transverse walls 6 and 7 are capable of being heated and in similar manner the outer walls of the chamber 2 located parallel to the transverse walls are also capable of being heated, whereas the short side walls of the chamber are not intended to be heated, or are only intended to be heated to a limited extent so that no temperature reducing drop towards the outside can arise. The heating can be performed in any known or convenient manner, and the particular means of heating forms no part of this invention. However, these walls may be heated either by ducts formed in the walls for the passage of a heated fluid or by electrical heating elements disposed in said ducts. The ducts are designated 13 in Figures 2 and 3. These ducts, it will be seen, are extended through the outer walls and through the intermediate walls 6 and 7.

An opening in the bottom of the chamber leads to a foil or plate shaping device which is secured against the chamber bottom, and which consists of a stationary jaw 9, U-shaped in horizontal cross section and a jaw 10 adjustable parallel thereto between the U limbs of 9. The gap remaining between the two jaws 9 and 10 is capable of being heated from both longitudinal sides by devices located in the jaws 9 and 10 (such as the ducts 13 heretofore referred to as a means for heating the walls of the chamber 4) and this gap has a considerable extension in depth, i. e., in the direction of movement of the mass forced through this gap which, in combination with the heating of the gap, serves for the purpose of shaping the foils or plates in the interior of the latter, so that these after leaving the gap do not have any tendency to expand after extrusion.

In order to utilize the inherent heat and adhesiveness of the foils and plates thus formed directly for coating glass plates for the production of non-splintering compound glass, the glass plates to be coated are moved transversely to the direction of movement of the mass extruded from the press at a distance from the outlet opening 5 which is about equal to the thickness of the extruding foils or plates so that the latter immediately after extrusion come into contact with the preferably pre-heated glass plates, are bent at right angles by these and carried therewith, and thus by the co-operation of the end faces of the press outlet nozzle, enter into intimate combination with the glass plates and drive away the air so as to prevent its enclosure between the mass and the glass plates.

As shown in Fig. 1 a continuous band 12, guided on rollers 11, carries the glass plates and is passed under the slot mouth 5. Between the upper and lower flights of the conveying bands 12 there may be provided heating devices for pre-heating the plates and above the conveying band there may be provided a supply device for an adhesive having a high boiling point.

With the apparatus as illustrated in Fig. 1 the polymerized mass is extruded continuously on to a series of glass plates. The intermediate sheet so formed may be divided by any convenient cutting means, hand or machine operated preferably when the plates have been carried clear of the press.

What I claim as new and desire to secure by Letters Patent is:

1. In a mechanism for extruding a plastic mass onto transparent plates, a member having a chamber for containing the plastic mass, a plunger operating within the chamber, means for heating the plastic mass within the chamber, a heated extrusion nozzle extending from the bottom of the chamber and having a flat under face, and means for conveying sheets of glass beneath and parallel to the under flat face of the nozzle and at a distance therefrom equal to the width from front to rear of the extrusion opening of the nozzle.

2. In a mechanism for extruding a plastic mass onto transparent plates, a member having a chamber, a plunger operating within the chamber, means for heating the plastic mass within the chamber, a heated extrusion nozzle extending downward from the bottom of the chamber and having a flat under face, the extrusion nozzle having a transversely extending extrusion slot, the nozzle and slot being relatively long from top to bottom, and means for conveying sheets of glass beneath and parallel to the under flat face of the nozzle and supporting said sheets of glass at a distance from the flat under face of the nozzle equal to the width from front to rear of the slot in the extrusion nozzle.

3. A press for the formation of plates or foils from an elastic mass of highly polymerized products by extrusion under pressure, including in combination a chamber forming member, a pressure operated plunger cooperating with said chamber forming member, a plurality of partition walls within said chamber extending entirely across the chamber and terminating short of the lower end of the chamber, means for heating said partition walls and heating the parallel walls of the chamber, said pressure plunger having cavities receiving and closely fitting the said partition walls, the chamber having an extrusion outlet in the said lower end adjacent which said partition walls terminate.

4. A press for the formation of plates or foils from an elastic mass of highly polymerized products by extrusion under pressure, including in combination a rectangular chamber-forming member, a rectangular pressure-operated plunger cooperating with said chamber forming member, a plurality of partition walls within said chamber extending across the chamber at right angles to one of its side walls and terminating short of the lower end of the chamber, and means for heating said partition walls and heating the parallel walls of the chamber, said pressure plunger having cavities receiving and closely fitting the said partition walls, the chamber having an extrusion outlet extending substantially the whole length of the chamber in the wall adjacent which said partition walls terminate.

5. A press for the formation of plates or foils from an elastic mass of highly polymerized products by extrusion under pressure, including in combination a substantially rectangular chamber having side walls and end walls, said chamber having a plurality of partition walls extending parallel to the end walls of the chamber but terminating short of the lower end of the chamber, means for heating said partition walls and the parallel end walls of the chamber, and a plunger cooperating with the chamber and having cavities receiving and closely fitting said partition walls, the chamber having an extrusion outlet in its lower end.

6. An extrusion press of the character described, including a chamber-forming element having a bottom wall formed with a discharge opening, the chamber having a transverse partition wall extending inward from the top of the chamber but terminating short of the bottom wall, a plunger fitting said chamber and having a transverse cavity complementary to and closely fitting over the partition wall, and means constructed and arranged to heat certain walls of the chamber and the partition wall.

7. A structure as in claim 6, wherein the chamber forming element has a plurality of transverse partition walls terminating short of the lower end of the chamber and the plunger has a plurality of complementary partition wall-receiving cavities.

8. An extrusion press of the character described, including an element defining a rectangular chamber, the chamber having a length greater than its width and having a bottom wall formed with a relatively narrow discharge opening extending parallel to the longitudinal walls of the chamber, the chamber having a longitudinally extending partition terminating short of the bottom wall of the chamber, a plunger fitting said chamber and having a transverse cavity complementary to the partition wall and fitting over it, and a nozzle extending downward from the discharge opening and formed to provide a narrow downwardly elongated discharge slot extending longitudinally of the chamber and defined by spaced confronting longitudinal walls, said walls of the slot and the partition wall having heating means therein.

9. A structure as in claim 8, wherein the longitudinal walls of the chamber and the bottom wall of the chamber are provided with heating means.

10. A structure as in claim 8, wherein one wall of the discharge slot of the nozzle is adjustable toward or from the other wall to regulate the thickness of the layer discharged through said nozzle.

11. A structure as in claim 8, wherein the nozzle is formed of two rigid parallel downwardly extending walls, one of said walls constituting the wall of the discharge slot, the other wall being recessed and having a plate disposed in the recess confronting the first-named wall and constituting the other wall of the discharge slot, and adjusting means extending through the second-named wall and bearing against the movable wall.

12. A structure as in claim 8, characterized by the provision of means for supporting plates of material upon which a layer of extruded material is to be deposited and conveying said plates in a direction at right angles to the plane of extrusion, said means being constructed and arranged to support the plates with their upper surfaces spaced from the lower end face of the nozzle a distance approximately equal to the thickness of the layer discharged from said nozzle.

ADOLF KÄMPFER.